United States Patent
Liu

(10) Patent No.: US 7,055,403 B2
(45) Date of Patent: Jun. 6, 2006

(54) FRICTIONAL CLUTCH ASSEMBLY

(76) Inventor: Ho-Tung Liu, No. 20-6, Alley 49, Lane 283, Chung Hwa W. Rd., Chang Hua City (TW)

(*) Notice: Subject to any disclaimer, the term of this patent is extended or adjusted under 35 U.S.C. 154(b) by 150 days.

(21) Appl. No.: 10/817,914

(22) Filed: Apr. 6, 2004

(65) Prior Publication Data

US 2004/0216544 A1    Nov. 4, 2004

(30) Foreign Application Priority Data

Apr. 7, 2003    (TW) .............................. 92202628 U

(51) Int. Cl.
*F16H 3/08* (2006.01)

(52) U.S. Cl. .......................................... 74/372; 74/368

(58) Field of Classification Search .......... 74/371–372, 74/352, 361, 368–369
See application file for complete search history.

(56) References Cited

U.S. PATENT DOCUMENTS

| | | | | |
|---|---|---|---|---|
| 2,937,539 A | * | 5/1960 | Mueller | 74/372 |
| 3,354,739 A | * | 11/1967 | Ivanchich | 74/339 |
| 3,396,593 A | * | 8/1968 | Moores, Jr. | 74/371 |
| 5,611,556 A | * | 3/1997 | Davidow | 280/236 |

* cited by examiner

*Primary Examiner*—Tisha Lewis
(74) *Attorney, Agent, or Firm*—Rosenberg, Klein & Lee

(57) ABSTRACT

A clutch assembly has a driving assembly and a transmission assembly. The driving assembly has an input axle and at least one driving gear. The transmission assembly is connected to the driving assembly and has an output axle, at least one driven gear, an inner axle and a unidirectional transmitting device. The driven gear is rotatably mounted on the output axle and engages with the driving gear. The inner axle is slidably mounted in the output axle and is engaged with the output axle to rotate with the output axle. The unidirectional transmitting device is mounted in the output to make the inner axle being driven by the at least one driven gear rotate in a unidirectional manner and to provide a clutching effect when the inner axle slides relative to the output axle.

12 Claims, 5 Drawing Sheets

FRICTIONAL CLUTCH ASSEMBLY

BACKGROUND OF THE INVENTION

1. Field of the Invention

The present invention relates to a clutch assembly, and more particularly to a frictional clutch assembly that can transmit power in a unidirectional manner.

2. Description of Related Art

With reference to FIG. 6, a conventional unidirectional transmitting assembly (10) in accordance with the prior art comprises a driving axle (11), a transmitting sleeve (13), multiple rollers (12) and an output axle (14). The transmitting sleeve (13) is received in the driving axle (11) and has multiple cutouts (15) defined in the outer surface of the sleeve (13). Each cutout (15) has a wide segment and a narrow segment and receives one of the rollers (12). The output axle (14) is mounted in and engages with the transmitting sleeve (13) to rotate with the transmitting sleeve (13).

When the driving axle (11) rotates along a direction corresponding to the narrow segments of the cutouts (15), clockwise as shown by the black arrow, the rollers (12) will be pushed to the narrow segments of the cutouts (15) by means of the friction between the driving axle (11) and the rollers (12). Consequently, the rollers (12) will be securely engaged between the driving axle (11) and the transmitting sleeve (13), such that the transmitting sleeve (13) will rotate with the driving axle (11) and the output axle (14) will be driven to rotate.

When the driving axle (11) rotates in an opposite direction that corresponds to the wide segments of the cutouts (15), counterclockwise as shown by the white arrow, the rollers (12) will move to the wide segments of the cutouts (15). Then, the rollers (12) will freely rotate in the cutouts (15), and the transmitting sleeve (13) and the output axle (14) will not rotate and will keep stationary. Accordingly, the input power will be transmitted in a unidirectional manner.

However, the conventional unidirectional transmitting assembly (10) does not have a function of a clutch, so it is necessary to add an additional clutch device for a machine with a conventional unidirectional transmitting assembly and this renders the machine expensive.

To overcome the shortcoming, the present invention tends to provide a frictional clutch assembly to mitigate or obviate the aforementioned problems.

SUMMARY OF THE INVENTION

The main objective of the invention is to provide a clutch assembly that can transmit power in a unidirectional manner. The clutch assembly has a driving assembly and a transmission assembly. The driving assembly has an input axle and at least one driving gear mounted on and driven by the input axle. The transmission assembly is connected to the driving assembly and has an output axle, at least one driven gear, an inner axle and a unidirectional transmitting device. The output axle has an axis and a central hole axially defined through the output axle. The at least one driven gear is rotatably mounted on the output axle and engages with the at least one driving gear. The inner axle is slidably mounted in the central hole in the output axle and is engaged with the output axle to rotate with the output axle. The unidirectional transmitting device is mounted in the output axle between the at least one driven gear and the inner axle to make the inner axle be driven by the at least one driven gear to rotate in a unidirectional manner and to provide a clutching effect when the inner axle slides relative to the output axle.

Other objects, advantages and novel features of the invention will become more apparent from the following detailed description when taken in conjunction with the accompanying drawings.

DETAILED DESCRIPTION OF PREFERRED EMBODIMENT

Figure 1:
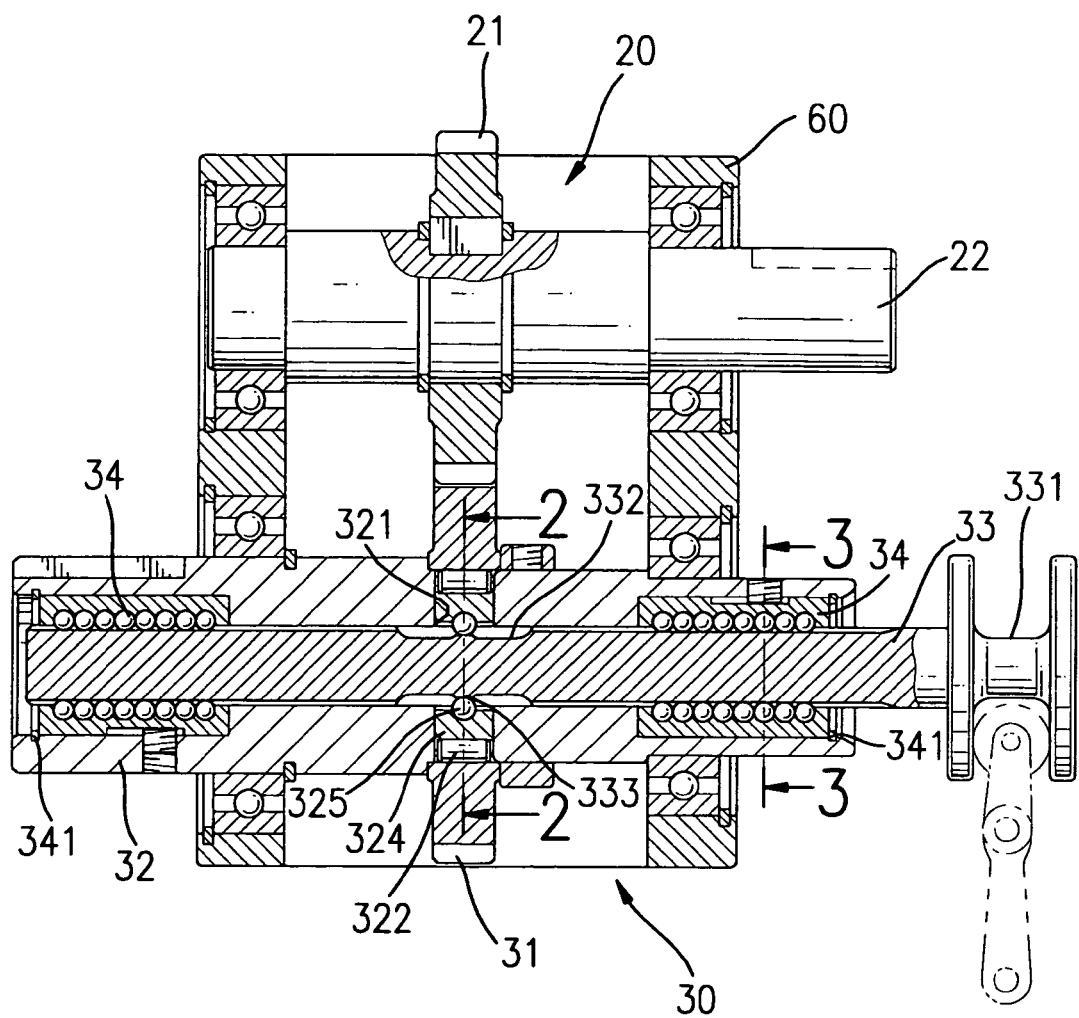
FIG. 1 is a side plan view in partial cross section of a clutch assembly in accordance with the present invention.
Figure 2:
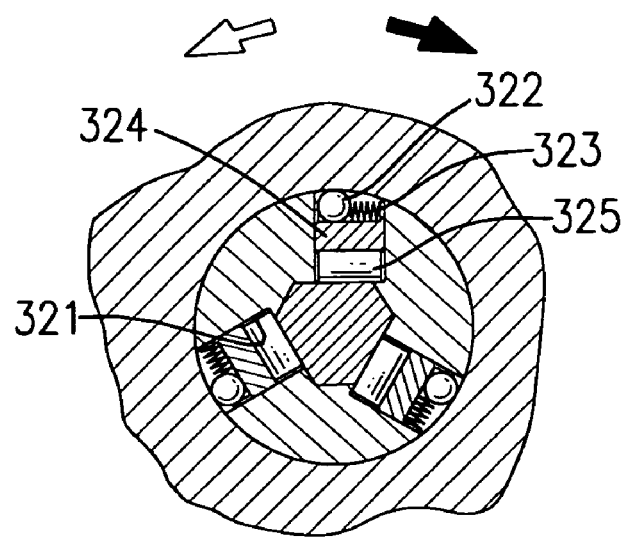
FIG. 2 is a side plan view in partial cross section of the transmitting device of the clutch assembly along line 2—2 in FIG. 1.
Figure 3:
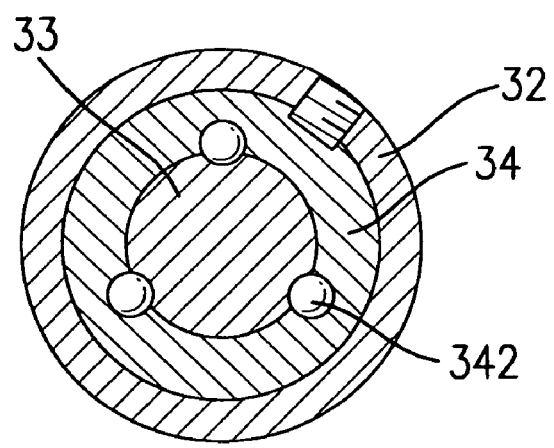
FIG. 3 is a side plan view in partial cross section of the inner axle and the output axle of the clutch assembly along line 3—3 in FIG. 1.
Figure 4:
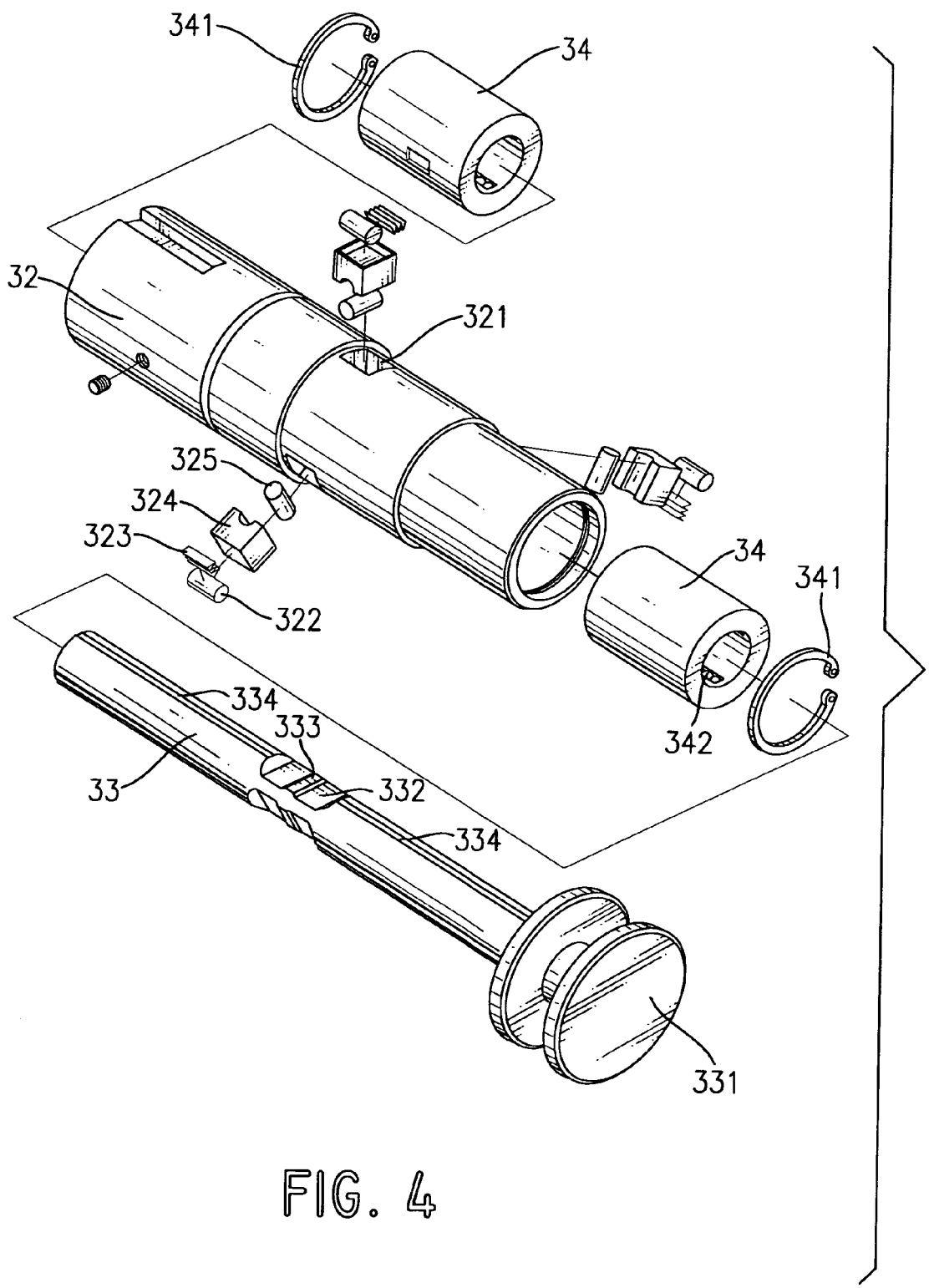
FIG. 4 is an exploded perspective view of the transmission assembly of the clutch assembly in FIG. 1.

With reference to FIGS. 1 to 4, a first embodiment of a clutch assembly in accordance with the present invention comprises a driving assembly (20) and a transmission assembly (30). The driving assembly (20) comprises an input axle (22) and a driving gear (21). The driving assembly (20) is adapted to be mounted in a housing (60) of a machine in which the clutch assembly is mounted. The input axle (22) is rotatably mounted on the housing (60) and is connected and driven by a driving device, such as a motor. The driving gear (21) is mounted on and driven by the input axle (22) to rotate with the input axle (22).

The transmission assembly (30) is connected to the driving assembly (20) and is adapted to be mounted in the housing (60). The transmission assembly (30) comprises a driven gear (31), an output axle (32), an inner axle (33) and a unidirectional transmitting device. The output axle (32) is rotatably mounted in the housing (60) and has an axis and a central hole axially defined through the output axle (32). The driven gear (31) is rotatably mounted on the output axle (32) and engages with the driving gear (21). The inner axle (33) is slidably mounted in the central hole in the output axle (32) and is engaged with the output axle (32) to rotate with the output axle (32). Two linear bearings (34) are mounted in the central hole at respectively two ends of the output axle (32). Two ends of the inner axle (33) penetrate respectively through the linear bearings (34), such that the inner axle (33) can slide relative to the output axle (32) at a low friction. Each linear bearing (34) has multiple rollers (342) axially mounted in the hole to abut with the inner axle (33), such that the inner axle (33) can slide along the central hole at a low friction. In addition, the inner axle (33) has multiple channels (334) longitudinally defined in the outer surface of the inner axle (33) to receive the rollers (342) of the linear bearing (34). Furthermore, two C-shaped fasteners (341) are mounted respectively in two ends of the central hole to hold the linear bearings (34) in place.

The unidirectional transmitting device is mounted in the output axle (32) and between the driven gear (31) and the inner axle (33) to make the inner axle (33) being driven by the driven gear (31) to rotate in a unidirectional manner. The unidirectional transmitting device comprises multiple frictional roller devices and multiple clutching recesses (332). The frictional roller devices are mounted in the output axle (32), and the output axle (32) has multiple bores (321) for receiving the frictional roller devices. Each frictional roller device comprises a base (324), an upper roller (322), a lower roller (325) and a biasing member (323). The base (324) is received in one of the bores (321) and has a top cavity (326) and a roller recess (328). The top cavity (326) is defined in the top of the base (324), and the roller recess (328) is defined in the bottom of the base (324) and along an axis perpendicular to the axis of the output axle (32). The upper roller (322) is received in the top cavity (326) in the base (324) and is aligned with the axis of the output axle (32). The biasing member (323) is received in the top cavity (326) and abuts against the upper roller (322) to provide the upper roller (322) a pushing force. Each biasing member (323) can be a spring. In an optional embodiment, the bores (321) are eccentrically defined in the output axle (32), such that a wide segment and a narrow segment are formed in the top cavity (326) of each base (324). In an alternative embodiment, the bores (321) can be radially defined in the output axle (32) and each top cavity (326) has an inclined bottom to form a wide segment and a narrow segment in the top cavity (326). The lower roller (325) is received in one of the bores (321) and is aligned with an axis perpendicular to the axis of the output axle (32), and the lower roller (325) is partially received in the roller recess (328) in the corresponding base (324).

The clutching recesses (332) are defined in the outer surface of the inner axle (33) and correspond respectively to the frictional roller devices. Each clutching recess (332) has a middle and a rib (333) formed on the middle to define two spaces respectively on two sides of the rib (333) in the recess (332). In addition, a pushed wheel (331) is mounted on one end of the inner axle (33) and is connected to a pulling device to pull the inner axle (33) to move relative to the output axle (32).

When the inner axle (33) is pulled to a position where the ribs (333) in the clutching recesses (332) abut against the lower rollers (325), the lower rollers (325) will push the bases (324) to make the upper rollers (322) abut against the driven gear (31). Accordingly, when the driving axle (22) is driven to rotate along a direction corresponding to the narrow segments of the top cavities (326) in the bases (324), clockwise as shown, the driven gear (31) will be driven to rotate by the driving gear (21). The top rollers (322) will be pushed to the narrow segments of the top cavities (326) by means of the friction between the driven gear (31) and the upper rollers (322). Consequently, the inner axle (33) will be driven to rotate, and the output axle (32) will rotate with the inner axle (33).

When the driving axle (22) rotates in an opposite direction that corresponds to the wide segments of the top cavities (326) in the base (324), counterclockwise as shown, the upper rollers (322) will be pushed to the wide segments in the top cavities (326). The upper rollers (322) will freely rotate in the top cavities (326), such that the inner axle (33) and the output axle (32) will not rotate and will keep stationary. Accordingly, the input power will be transmitted in a unidirectional manner.

When the inner axle (33) is pulled to a position where the ribs (333) in the clutching recesses (332) do not abut against the lower rollers (325), the lower rollers (325) will be received in one of the spaces in the clutching recesses (332) and will leave the bases (324). The inner axle (33) will not be driven to rotate even when the input axle (22) rotates along the direction corresponding to the narrow segments of the top cavities (326) in the bases (324), clockwise as shown, such that a clutching effect is provided.

With such an arrangement, a device simultaneously having a clutching effect and a unidirectional transmission effect is provided. This can simplify the structure, as well as the cost of manufacturing a machine that needs both aforementioned features.

Figure 5:
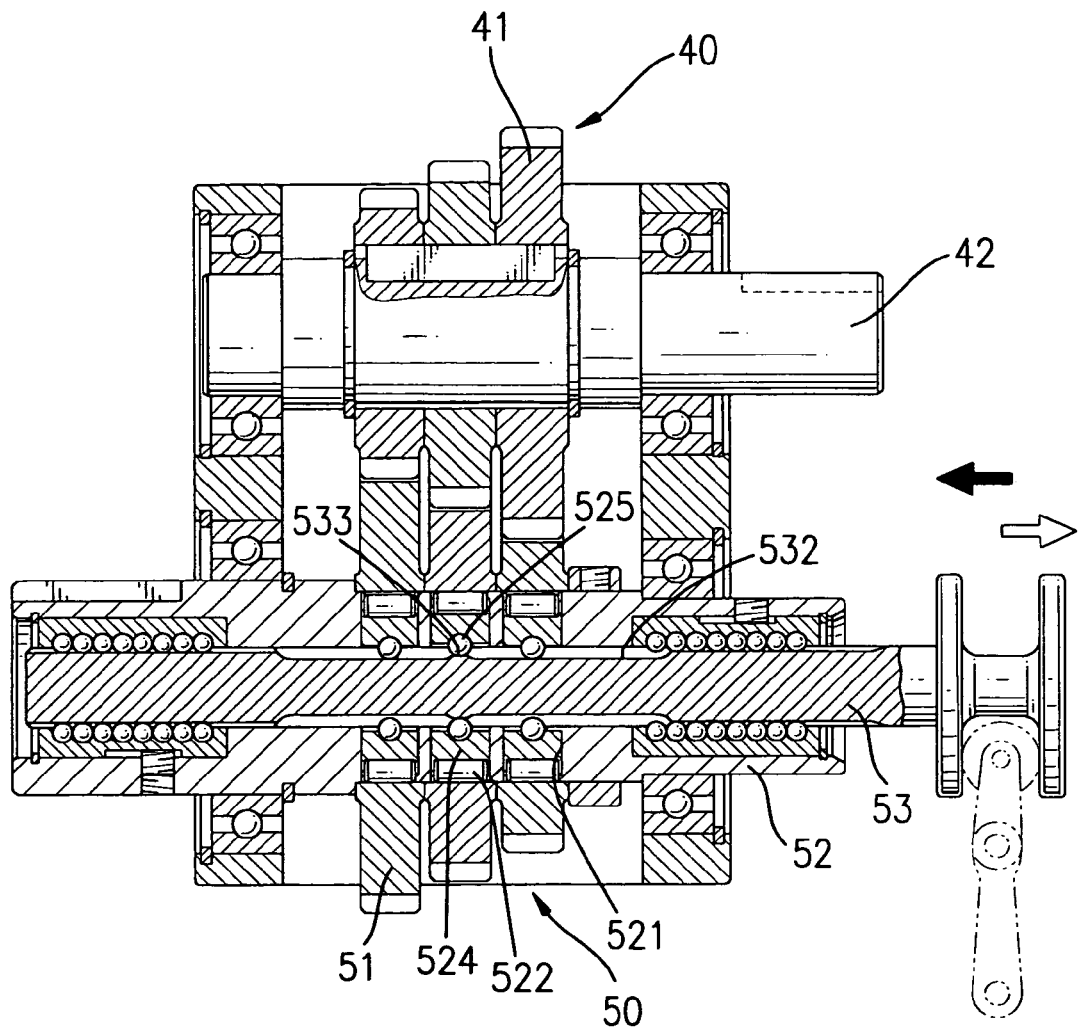
FIG. 5 is a side plan view in partial cross section of another embodiment of a clutch assembly in accordance with the present invention.
Figure 6:
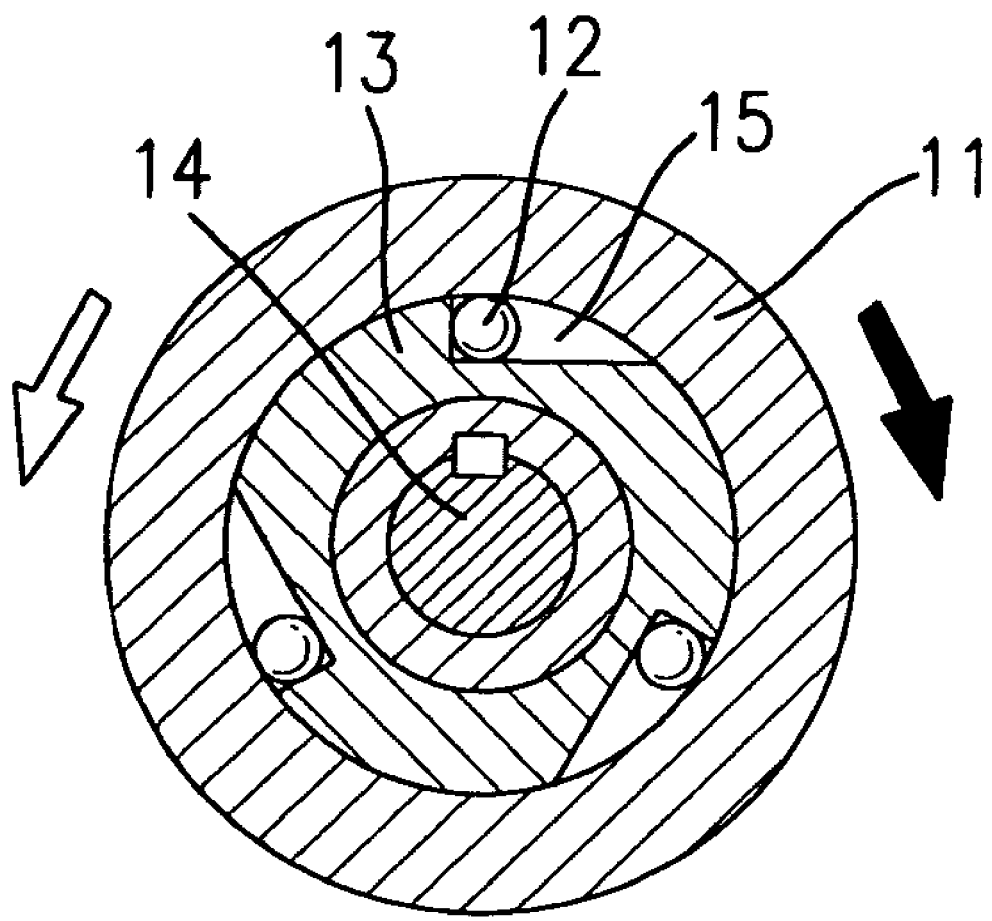
FIG. 6 is a side plan view in partial cross section of a conventional unidirectional transmitting assembly in accordance with the prior art.

With reference to FIG. 5, a second embodiment of a clutch assembly comprises a driving assembly (40) and a transmission assembly (50). The driving assembly (40) comprises an input axle (42) and multiple driving gears (41). The driving gears (41) are mounted on and driven by the input axle (42) to rotate with the input axle (42).

The transmission assembly (50) comprises multiple driven gears (51), an output axle (52), an inner axle (53) and a unidirectional transmitting device. The structures of the output axle (52) and the inner axle (53) are the same as those of the first embodiment aforementioned and are not further described. The driven gears (51) are rotatably mounted on the output axle (52) and engage respectively with the driving gears (41).

The unidirectional transmitting device is mounted in the output axle (52) and between the driven gears (51) and the inner axle (53) to make the inner axle (53) being driven by one of the driven gears (51) rotate in a unidirectional manner. The unidirectional transmitting device comprises multiple frictional roller devices and multiple clutching recesses (532). The frictional roller devices are mounted in the output axle (52) and correspond to one of the driven gears (51). The output axle (52) has multiple bores (521) for receiving the frictional roller devices. The structure of each frictional roller device is same as that of the friction roller device in the first embodiment aforementioned and is not further described. The clutching recesses (532) are defined in the outer surface of the inner axle (53) and correspond respectively to the frictional roller devices. Each clutching recess (532) has a middle and a rib (533) formed on the middle to define two spaces respectively on two sides of the ribs in the recess (532).

When the inner axle (53) is pulled to a position where the ribs (533) in the clutching recesses (532) abut against the lower rollers (525) of the frictional roller devices corresponding to one of the driven gears (51), the lower rollers (525) will push the bases (524) to make the upper rollers (522) abut against the corresponding driven gear (51). Accordingly, when the driving axle (42) is driven to rotate along a direction corresponding to the narrow segments of the top cavities in the bases (524), the inner axle (53) will be driven to rotate with the driven gear (51), and the output axle (52) will rotate with the inner axle (53).

When the inner axle (53) is pulled to a position where the ribs (533) abut against the lower rollers (525) of the frictional roller devices corresponding to another driven gear (51), the inner axle (53) will be driven to rotate with the driven gear (51) at a different speed. Accordingly, a gear-changing effect is provided, and the use of the clutch is versatile.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clutch assembly comprising:
   a driving assembly having an input axle;
   at least one driving gear mounted on and driven by the input axle;
   a transmission assembly connected to the driving assembly and having (a) an output axle having an axis and a central hole axially defined through the output axle, (b) at least one driven gear rotatably mounted on the output axle and engaging with the at least one driving gear, (c) an inner axle slidably mourned in the central hole in the output axle and engaged with the output axle to rotate with the output axle, and (d) a unidirectional transmitting device mounted in the output axle and between the at least one driven gear and the inner axle to make the inner axle being driven by the at least one driven gear rotate in a unidirectional manner and to provide a clutching effect when the inner axle slides relative to the output axle; and,
   two linear bearings mounted in the central hole respectively at two ends of the output axle for two ends of the inner axle penetrating respectively through the linear bearings, the inner axle having an outer surface and multiple channels defined in the outer surface, each linear bearing having multiple rollers axially mounted in the hole and received in the channels in the inner axle to abut with the inner axle.

2. A clutch assembly comprising:
   a driving assembly having an input axle;
   at least one driving gear mounted on and driven by the input axle; and,
   a transmission assembly connected to the dnving assembly and having (a) an output axle having an axis and a central hole axially defined through the output axle, (b) at least one driven gear rotatably mounted on the output axle and engaging with the at least one driving gear, (c) an inner axle slideably mounted in the central hole in the output axle and engaged with the output axle to rotate with the output axle, and (d) a unidirectional transmitting device mounted in the output axle and between the at least one driven gear and the inner axle to make the inner axle being driven by the at least one driven pear rotate in a unidirectional manner and to provide a clutching effect when the inner axle slides relative to the output axle, the unidirectional transmitting device including multiple frictional roller devices mounted in the output axle, each frictional roller device corresponding to one of the at least one driven gear and having a base having a top, a bottom, a top cavity defined in the top of the base and having a wide segment and a narrow segment, a roller recess being defined in the bottom of the base and along an axis perpendicular to the axis of the output axle, an upper roller being received in the top cavity in the base and aligned with the axis of the output axle, a biasing member being received in the top cavity and abutting against the upper roller to provide the upper roller a pushing force, a lower roller being mounted along the axis vertical to the axis of the output axle and partially received in the roller recess, multiple clutching recesses being defined in the outer surface of the inner axle and corresponding respectively to the frictional roller devices, and each clutching recess having a middle and a rib formed on the middle to define two spaces respectively on two sides of the rib in the recess.

3. The clutch assembly as claimed in claim 2, wherein the output axle has multiple bores for receiving the frictional roller devices and communicating with the central hole.

4. The clutch assembly as claimed in claim 3, wherein the bores are eccentrically defined in the output axle.

5. The clutch assembly comprising:
   a driving assembly having an input axle;
   at least one driving gear mounted on and driven by the input axle;
   a transmission assembly connected to the driving assembly and having (a) an output axle having an axis and a central hole axially defined through the output axle, (b) at least one driven gear rotatably mounted on the output axle and engaging with the at least one driving gear, (c) an inner axle slidably mounted in the central hole in the output axle and engaged with the output axle to rotate with the output axle, and (d) a unidirectional transmitting device mounted in the output axle and between the at least one driven gear and the inner axle to make the inner axle being driven by the at least one driven gear rotate in a unidirectional manner and to provide a clutching effect when the inner axle slides relative to the output axle; and,
   a pushed wheel mounted on one end of the inner axle.

6. The clutch assembly as claimed in claim 1, wherein the driving assembly has multiple driving gears mounted on the input axle; and the transmission assembly has multiple driven gears rotatably mounted on the output axle and engaging respectively with the driving gears.

7. The clutch assembly as claimed in claim 6 further comprising two linear bearings mounted in the central hole respectively at two ends of the output aide for two ends of the inner axle penetrating respectively through the linear bearings.

8. The clutch assembly as claimed in claim 7, wherein the inner axle has an outer surface and multiple channels defined in the outer surface; and each linear bearing has multiple rollers axially mounted in the hole and received in the channels in the inner axle to abut with the inner axle.

9. The clutch assembly as claimed in claim 6, wherein the unidirectional transmitting device comprises multiple frictional roller devices mounted in the output axle, each frictional roller device corresponding to one of the driven gears and having a base having a top, a bottom, a top cavity defined in the top of the base and having a wide segment and a narrow segment, a roller recess being defined in the bottom of the base and along an axis perpendicular to the axis of the output axle, an upper roller being received in the top cavity in the base and aligned with the axis of the output axle, a biasing member being received in the top cavity and abutting against the upper roller to provide the upper roller a pushing force, a lower roller being mounted along the axis perpendicular to the axis of the output axle and partially received in the roller recess, multiple clutching recesses being defined in the outer surface of the inner axle and corresponding respectively to the frictional roller devices, and each clutching recess having a middle and a rib formed on the middle to define two spaces respectively on two sides of the rib in the recess.

10. The clutch assembly as claimed in claim 9, wherein the output axle has multiple bores for receiving the frictional roller devices and communicating with the central hole.

11. The clutch assembly as claimed in claim 10, wherein the bores are eccentrically defined in the output axle.

12. The clutch assembly as claimed in claim 6 further comprising a pushed wheel mounted on one end of the inner axle.

* * * * *